United States Patent
Igarashi

(10) Patent No.: US 7,020,380 B1
(45) Date of Patent: Mar. 28, 2006

(54) IMAGE RECORDING SYSTEM AND IMAGE RECORDING METHOD

(75) Inventor: Takashi Igarashi, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/379,837

(22) Filed: Aug. 24, 1999

(30) Foreign Application Priority Data

Aug. 31, 1998 (JP) ................................. 10-244984

(51) Int. Cl.
*H04N 5/76* (2006.01)
*H04N 5/225* (2006.01)

(52) U.S. Cl. ..................................... 386/46; 348/211.3

(58) Field of Classification Search .................. 386/46, 386/52, 65; 348/211.3, 239; 358/402
See application file for complete search history.

(56) References Cited

U.S. PATENT DOCUMENTS 5,717,496 A * 2/1998 Satoh et al. ................. 358/402
6,201,571 B1 * 3/2001 Ota ............................. 348/239
2003/0158979 A1 * 8/2003 Tateyama et al. ............. 710/33

* cited by examiner

*Primary Examiner*—Thai Tran
(74) *Attorney, Agent, or Firm*—Lucas & Mercanti, LLP

(57) ABSTRACT

An image recording system includes: an image recording device for recording an image based on image information; a first controller for controlling the image recording device; a second controller; and a memory which is controlled by the second controller and on which image information is stored. The first controller can send a reading command signal to the second controller for reading the image information, the second controller reads the image information out of the memory based on the reading command signal, and transmits the image information to the first controller, and the first controller receives the image information transmitted from the second controller, and controls the image recording device so that an image based on the image information is recorded.

22 Claims, 5 Drawing Sheets

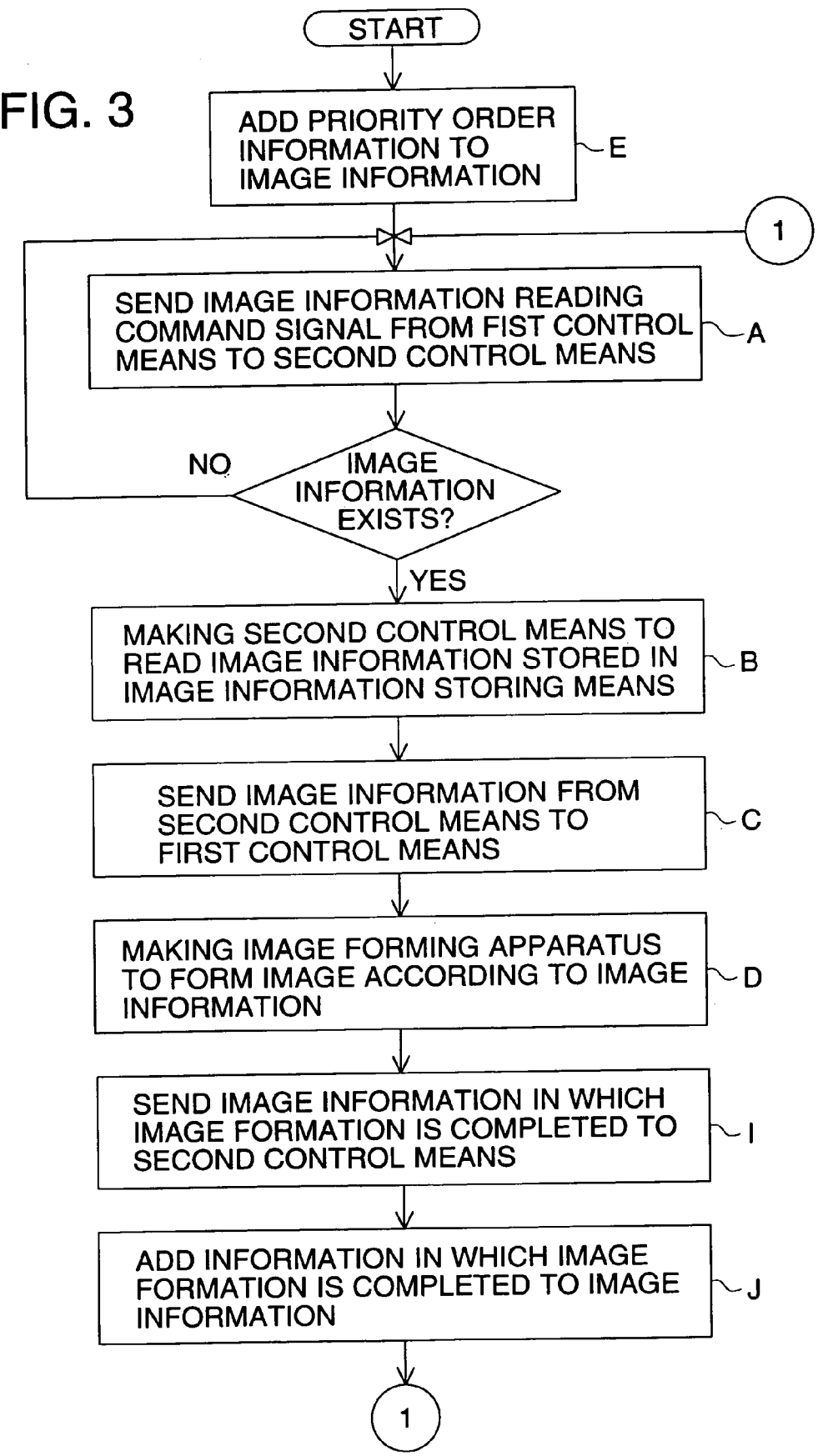

IMAGE RECORDING SYSTEM AND IMAGE RECORDING METHOD

BACKGROUND OF THE INVENTION

The present invention relates to an image recording apparatus having therein a means to record an image based, for example, on digitized image data.

Recently, due to digitization of an exposure means of an image forming apparatus called "a mini-lab", it has become possible to make a hard copy of image information recorded not only on a photographic film but also on various media such as a floppy disk and PCMCIA-conforming card, CD-R, and MO by an apparatus having one image forming means. Due to this, in many cases, the image forming means is connected with a personal computer (hereinafter referred to also as PC) and with an input device as well as a storage device both attached to PC, by the use of a communication means such as LAN (Local Area Network), WAN (Wide Area Network), an internet connection network and dial-up connection, so that they may be subjected to interlocking operations. Namely, in most cases, it is possible to build the system wherein image information which is taken in by the input device and stored in the storage device is sent to the image forming means by the use of a communication means such as LAN, WAN (Wide Area Network), an internet connection network and dial-up connection, when an operator operates PC, and the image forming means processes image information in the sequence in which the image information is sent.

Presently, even in the case of this image forming system, its high efficiency is strongly demanded, and in particular, high rate of operation of the expensive image forming means is strongly demanded.

When a medium on which image information is recorded is deposited, it sometimes happens that a customer is required to designate the finishing date and hour in A–D ranking (rank A: within 30 minutes at super-express speed, rank B: within 2 hours at express speed, rank C: normal, and rank D: the next day), so that value added derived from the reduction of the image forming time may be offered. Namely, the customer is supposed to select the finishing date and hour based on its reasons and budget. Therefore, the priority order is naturally established for image forming. Actually, however, there are many troubles that an operator makes a mistake in the priority order and a photograph can not be finished by the designated date and hour.

For a customer who desires image forming through the network connecting the remote place such as WAN or dial-up connection, it is possible to order the image forming without leaving its place of work or its home, which results in saving of time and labor.

When there are plural printers which are connected with a network like this, an orderer can send its order data to the image forming apparatus which is set to the condition desired by the orderer, thus the orderer can save time and labor.

Accordingly, an object to be attained by the invention is to provide an image recording technology which can make efficiency of image recording, especially the rate of operation of the image recording means to be improved. The object further is to provide an image recording technology which can record images from image data in the priority order established in advance, and is free from troubles of delayed finishing.

SUMMARY OF THE INVENTION

The objects mentioned above can be attained by either one of the following structures.

Structure 1: An image recording system having therein an image recording device which records images based on image information, a first controller which controls the image recording device, a second controller, and memory which is controlled by the second controller and on which image information is stored, wherein the first controller can send to the second controller the reading command signals for reading the aforesaid image information, the second controller reads the image information out of the memory based on the aforesaid reading command signals, and transmits the image information to the first controller, and the first controller receives the image information transmitted from the second controller, and controls the image recording device so that images based on the image information may be recorded.

Structure 2: The image recording system according to Structure 1 wherein the second controller is connected to the first controller through a communication network, the first controller can transmit to the second controller the reading command signals for reading the image information through the communication network, and the second controller reads the image information out of the memory based on the reading command signals, and transmits the image information to the first controller through the communication network.

Structure 3: The image recording system according to Structure 1 wherein the first controller receives the image information sent from the second controller, and makes the image recording device to operate.

Structure 4: The image recording system according to Structure 1 wherein the first controller sends the reading command signals to the second controller at a prescribed interval.

Structure 5: The image recording system according to Structure 1 wherein the first controller sends completion information which indicates that image recording of the image information has been completed to the second controller, after completion of the image recording of the image information, and the second controller generates information indicating that image recording of the image information has been completed based on the aforesaid completion information.

Structure 6: The image recording system according to Structure 5 wherein the completion information is identification information corresponding to the aforesaid image information.

Structure 7: The image recording system according to Structure 1 wherein the first controller sends the first completion information which indicates that image recording of the image information has been completed to the second controller, after completion of the image recording of the image information, and the second controller adds to the image information the second information of completion indicating completion of image recording.

Structure 8: The image recording system according to Structure 7 wherein the completion information is identification information corresponding to the image information.

Structure 9: An image recording system having therein an image recording device which records images based on image information, a first controller which controls the image recording device, a second controller, and memory which is controlled by the second controller and on which image information is stored, wherein the second controller has a means to add priority order information for image recording for each image information stored in the memory, and reads image information to which the priority order information is added, out of the memory to send the image information to the first controller, and the first controller receives the image information sent from the second controller, and controls the image recording device so that image based on the image information may be recorded, based on the priority order information.

Structure 10: The image recording system according to Structure 9 wherein the second controller is connected to the first controller through a communication network, and the second controller sends the image information to the first controller through the communication network.

Structure 11: The image recording system according to Structure 9 wherein the first controller sends completion information which indicates that image recording of the image information has been completed to the second controller, after completion of the image recording of the image information, and the second controller generates information which indicates that image recording of the image information has been completed based on the completion information.

Structure 12: The image recording system according to Structure 11 wherein the completion information is identification information corresponding to the image information.

Structure 13: The image recording system according to Structure 9 wherein the first controller sends the first completion information which indicates that image recording of the image information has been completed to the second controller, after completion of the image recording of the image information, and the second controller adds to the image information the second information of completion indicating completion of image recording.

Structure 14: The image recording system according to Structure 13 wherein the completion information is identification information corresponding to the image information.

Structure 15: An image recording method having steps of sending the reading command signals for reading image information from the first controller to the second controller, the image information being stored in the memory controlled by the second controller, making the second controller to read the image information out of the memory based on the reading command signals, after the second controller has received the reading command signals, making the second controller to send the image information read out of the memory to the first controller, and making the first controller to receive the image information and causing the image recording device to record images based on the image information, wherein the image recording device is controlled by the first controller.

Structure 16: The image recording method according to Structure 15 wherein the first controller and the second controller are connected to each other through a communication network.

Structure 17: The image recording method according to Structure 15 wherein the first controller receives the image information sent from the second controller, and operates the image recording device.

Structure 18: The image recording method according to Structure 15 wherein the first controller sends the reading command signals to the second controller at a prescribed interval.

Structure 19: The image recording method according to Structure 15 which further has therein steps of sending from the first controller to the second controller the information of completion which indicates that image recording of the image information has been completed, after completion of the image recording of the image information, and making the second controller to generate information showing that image recording of the image information has been completed, based on the completion information.

Structure 20: The image recording system according to Structure 19 wherein the completion information is identification information corresponding to the image information.

Structure 21: The image recording system according to Structure 15 which further has a step for the first controller to send to the second controller the first information of completion showing that image recording of the image information has been completed, and a step to make the second controller to add to the image information the second information of completion showing that image recording has been completed, based on the completion information.

Structure 22: The image recording system according to Structure 21 wherein the completion information is information of the numbers corresponding to the image information.

Structure 23: An image recording method having steps of making the second controller to add to each image information stored in memory the priority order information for recording images, the memory being controlled by the second controller, making the second controller to read image information to which the priority order information has been added out of the memory, making the second controller to send the image information read out of the memory to the first controller, and making the first controller which has received the image information sent from the second controller to cause the image recording device to record images based on the image information, based on the priority order information, wherein the image recording device is controlled by the first controller.

Structure 24: The image recording method according to Structure 23 wherein the second controller is connected to the first controller through a communication network, and the image information stated above is sent to the first controller through the communication network.

Structure 25: The image recording method according to Structure 23 which further has steps for the first controller to send to the second controller the information of completion showing that image recording for the image information has been completed, after completion of the image recording for the image information, and for the second controller to generate information showing that image recording for the image information has been completed, based on the completion information.

Structure 26: The image recording system according to Structure 25 wherein the completion information is identification information corresponding to the image information.

Structure 27: The image recording system according to Structure 23 which further has steps for the first controller to send to the second controller the first information of completion showing that image recording for the image information has been completed, after completion of the image recording for image information, and for the second controller to add to the image information the second information of completion showing that the image recording for the image information has been completed, based on the completion information.

Structure 28: The image recording system according to Structure 27 wherein the completion information is identification information corresponding to the image information.

Further, the preferable structure is represented by the following.

An image forming system having therein an image forming means which forms an image from image information, a first control means which controls the image forming means, a second control means which is connected to the first control means through a communication network and an image information storage means which is controlled by the second control means and stores image information, wherein the first control means sends image information reading command signals to the second control means through the communication network, the second control means which has received the image information reading command signals reads image information stored in the image information storage means, and it further sends the image information thus read out to the first control means through the communication network, and the first control means receives the image information sent from the second control means to operate the image forming means so that an image may be formed from the image information in the aforesaid arrangement.

Incidentally, in the image forming system stated above, it is preferable to structure so that the first control means may send image information reading command signals to the second control means at prescribe intervals based on a certain rule, for the further improvement of the rate of operation of the image forming means.

Aforesaid object is attained by an image forming system having therein an image forming means which forms an image from image information, a first control means which controls the image forming means, a second control means which is connected to the first control means through a communication network and an image information storage means which is controlled by the second control means and stores image information, wherein the second control means has a means to add the priority order information to each image information stored in the image information storage means, then reads the image information to which the priority order information is added when necessary, and sends the image information thus read to the first control means through the communication network, while the first control means receives image information sent from the second control means and operates the image forming means, so that an image is formed from the image information based on the priority order.

Incidentally, in the image forming system stated above, it is preferable that the first control means sends to the second control means the identification information of image information whose image formation has been completed, after image formation from image formation has been completed, and the second control means adds information for completion of image formation to the image information corresponding to the identification information sent from the first control means. It is also possible to arrange so that the first control means directly controls an image information storage means connected to the second control means. By doing this, it is possible to distinguish clearly between image information for which the image formation has not been completed and image information for which the image formation has been completed, and to erase immediately, when necessary, the image information for which the image formation has been completed. Therefore, troubles resulting from insufficient capacity for storage of the image information storage means can be avoided effectively.

Aforesaid object is further attained by an image forming method having therein an image forming means which forms an image from image information, a first control means which controls the image forming means, a second control means which is connected to the first control means, and an image information storage means wherein there are provided step A to send image information reading command signals from the first control means to the second control means through the communication network, step B to make the second control means to read the image information stored in the image information storage means after the second control means has received the image information reading command signals sent in the step A, step C to send the image information read in the step B to the first control means from the second control means through the communication network, and step D to form an image from image information by making the first control means which has received image information sent in the step C to operate the image forming means.

Incidentally, in the image forming method stated above, it is preferable to structure so that the first control means may send image information reading command signals to the second control means at prescribe intervals based on a certain rule, for the further improvement of the rate of operation of the image forming means.

Further, aforesaid object is attained by an image forming method employing an image forming system which has therein an image forming means which forms an image from image information, a first control means which controls the image forming means, a second control means which is connected to the first control means through a communication network and an image information storage means which is controlled by the second control means and stores image information, wherein the second control means is provided with step E to make the second control means to add the priority order information for image forming to each image information stored in the image information storage means, step F to make the second control means to read, when necessary, the image information to which the priority order information has been added in the step E out of the image information storage means, step G to send the image information read out in the step F from the second control means to the first control means through the communication network, and step H to make the first control means which has received the image information sent in the step G to operate the image forming means so that an image is formed from the image information based on the priority order.

For the same reason as in the image forming system explained earlier, namely, for the reason to distinguish clearly between image information for which the image formation has not been completed and image information for which the image formation has been completed, it is preferable that the image forming method is also provided with step I to make the first control means to send to the second control means the information showing that image formation has been completed, after the image formation from image information has been completed, and with step J to make the second control means to add information showing completion of image formation to the image information corresponding to the identification information sent from the first control means in the step I.

As stated above, in the invention, the first control means first sends the image information reading command signals to the second control means through the communication network. Then, the second control means which has received the image information reading command signals reads image information stored in an image information storage means, and further sends the image information thus read to the first control means through a communication network. After this, the first control means receives the image information sent from the second control means and operates the image forming means so that image formation from image information may be carried out. Namely, in the invention, an arrangement is made so that a control means on the part of the image forming means checks the presence or absence of image information to be subjected to image formation by using a communication network, and if it exists, the control means makes the image information to be subjected to image formation on its own initiative, even when no command is given by an operator. It is therefore possible to minimize a period for the image forming means to be suspended, resulting in possibility to promote the efficiency of image forming processing, especially to improve the rate of operation of the image forming means greatly.

Further, in the invention, the second control means is provided with a means to add priority order information for image formation to each image information stored in an image information storage means. When necessary, the second control means reads image information to which the priority order information is added out of the image information storage means, and it further sends the image information thus read to the first control means through a communication network. After this, the first control means receives image information sent from the second control means, and operates the image forming means, so that image formation from the image information may be conducted based on the priority order. In other words, the image information is automatically subjected to image formation based on the priority order established in advance, without receiving any instruction directly from an operator. Therefore, troubles of delayed finish do not take place, which is different from the occasion in the past where a command for forming an image has been issued by an operator.

BRIEF DESCRIPTION OF THE DRAWINGS

FIG. 3 is a flow diagram showing image forming procedures related to the present embodiment.

Figure 4A:
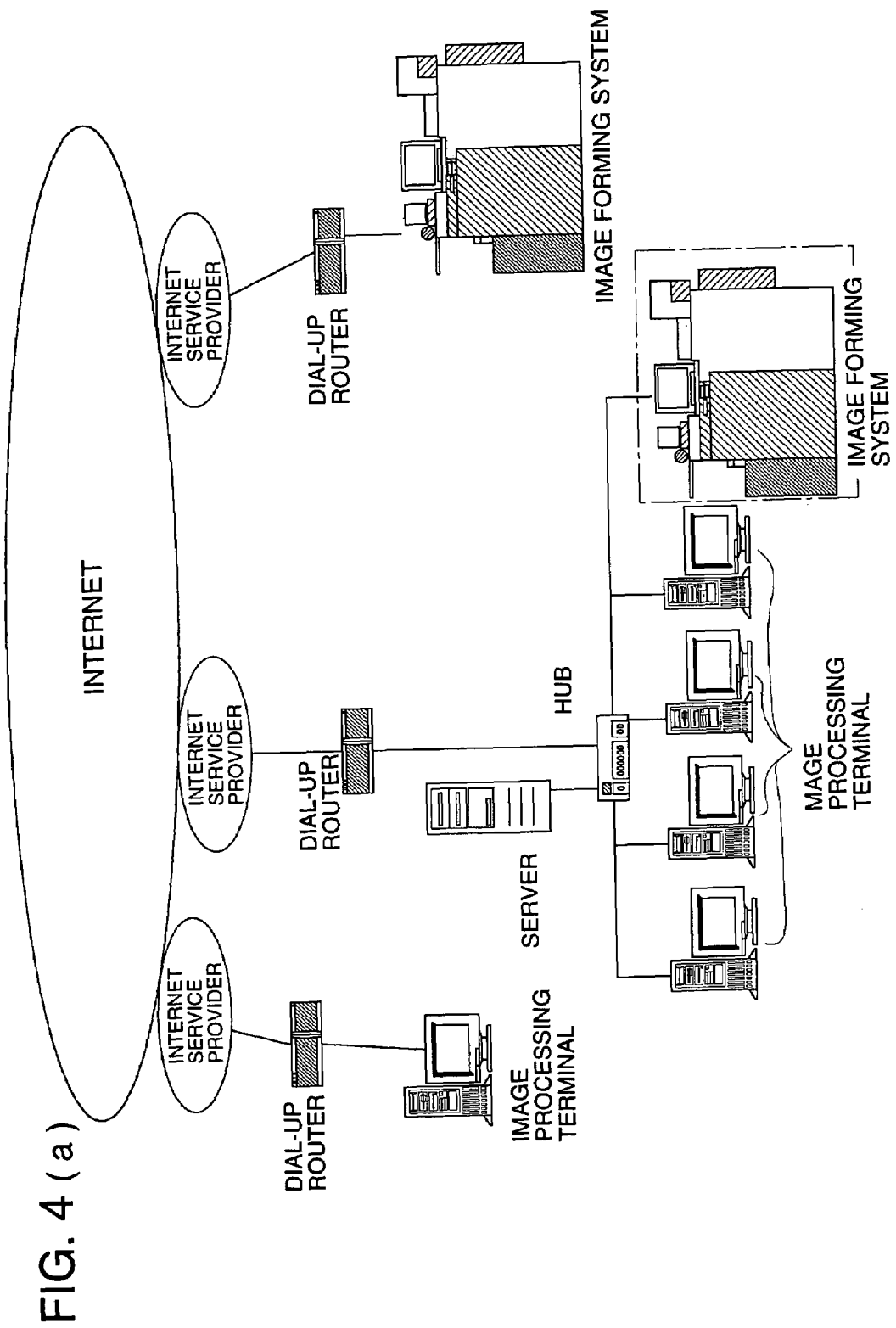

Each of FIGS. 4(a) and 4(b) is a diagram showing an example employing another communication means.

DETAILED DESCRIPTION OF THE PREFERRED EMBODIMENT

An image forming system explained as follows as an embodiment of the invention is provided with an image forming means which forms an image from image information, a first control means which controls the image forming means, a second control means which is connected to the first control means through a communication network, and an image information storage means which is controlled by the second control means and stores image information, and the first control means sends image information reading command signals to the second control means through the communication network, while the second control means which has received the image information reading command signals reads image information stored in the image information storage means and further sends the image information thus read to the first control means through the communication network, and the first control means receives the image information sent from the second control means and operates the image forming means so that an image may be formed from the image information.

In the present embodiment, in particular, the first control means is structured to send image information reading command signals to the second control means at prescribed intervals. The second control means has a means to add priority order information for image formation to each image information stored in an image information storage means, then it reads, when necessary, the image information to which the priority order information has been added out of the image information storage means, and it further sends the image information thus read to the first control means through the communication network, while the first control means receives the image information sent from the second control means and operates the image forming means so that image formation from the image information may be carried out based on the priority order. Further, in the present embodiment, it is structured so that the first control means sends identification information of the image information whose image formation has been completed to the second control means after completion of image formation from the image information, while the second control means adds the information whose image formation has been completed to the image information corresponding to the identification information sent from the first control means.

The image forming method explained as an embodiment of the invention as follows is one employing the image forming system provided with an image forming means which conducts image formation from image information, a first control means which controls the image forming means, a second control means which is connected to the first control means through a communication network, and an image information storage means which is controlled by the second control means and stores image information, and the image forming method is provided with step A to send image information reading command signals to the second control means from the first control means through the communication network, step B to make the second control means to read image information stored in the image information storage means after the second control means has received the image information reading command signals sent in the step A, step C to send the image information read in the step B from the second control means to the first control means through the communication network, and step D to make the first control means which has received the image information sent in the step C to operate the image forming means for image formation from the image information.

In the present embodiment, in particular, the first control means is structured to send image information reading command signals to the second control means at prescribed intervals. Further, the image forming method in the present embodiment is provided with step E to make the second control means to add priority order information for image forming to each image information stored in the image information storage means. Therefore, the image forming method is regarded also as one provided with step F to make the second control means to read, when necessary, the image information to which the priority order information has been added in the step E out of the image information storage means, step G to send the image information read in the step F from the second control means to the first control means through the communication network, and step H to make the first control means which has received the image information sent in the step G to operate the image forming means so that image formation from the image information may be carried out based on the priority order. In addition the foregoing, the present embodiment is provided with step I to make the first control means to send the identification information of the image information whose image formation has been completed to the second control means, after image formation from the image information has been completed, and with step J to make the second control means to add information whose image formation has been completed to the image information corresponding to the identification information sent from the first control means in the step I.

Figure 1:
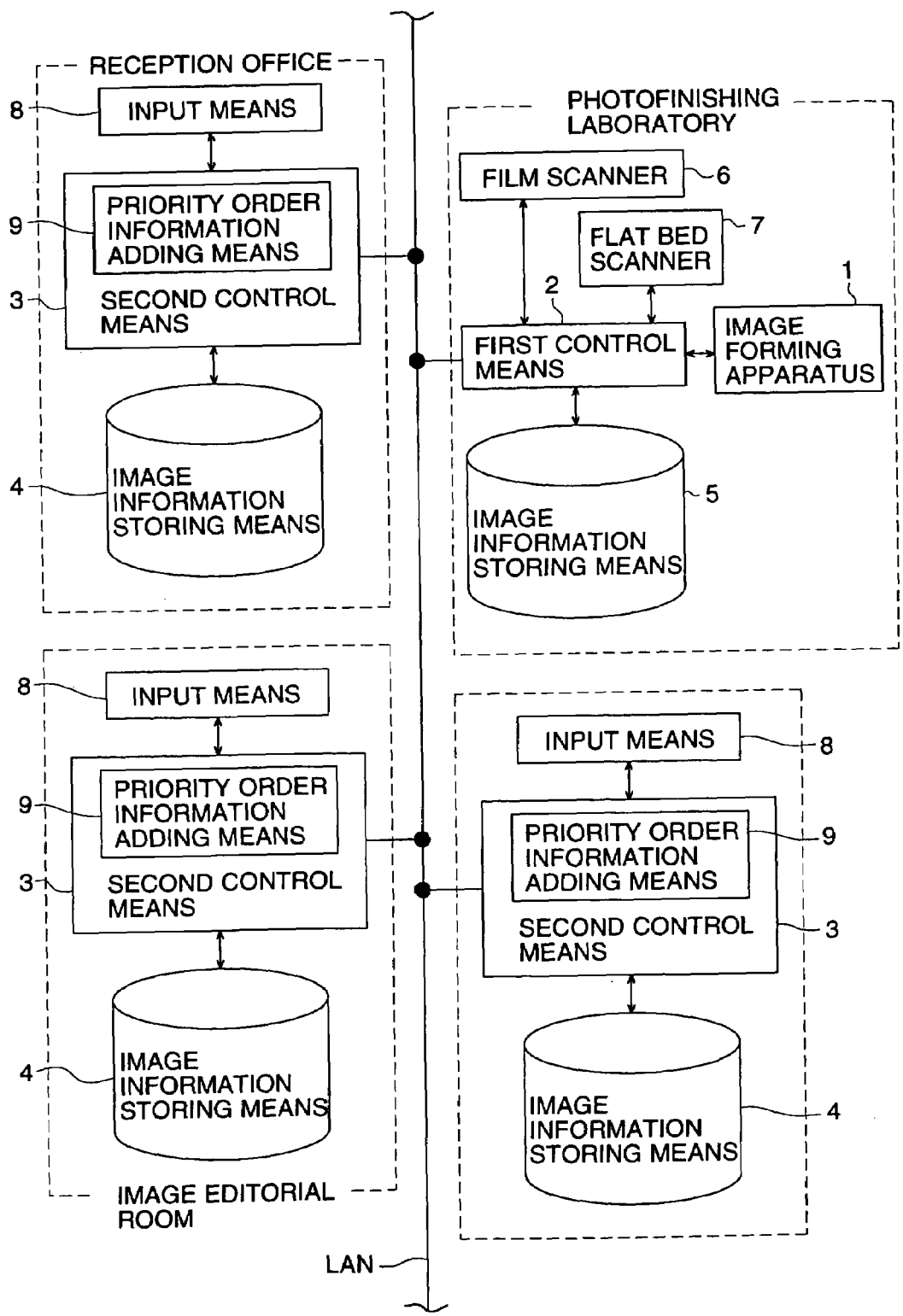
FIG. 1 is a block diagram showing the schematic structure of an image forming system in the present embodiment.
Figure 2:
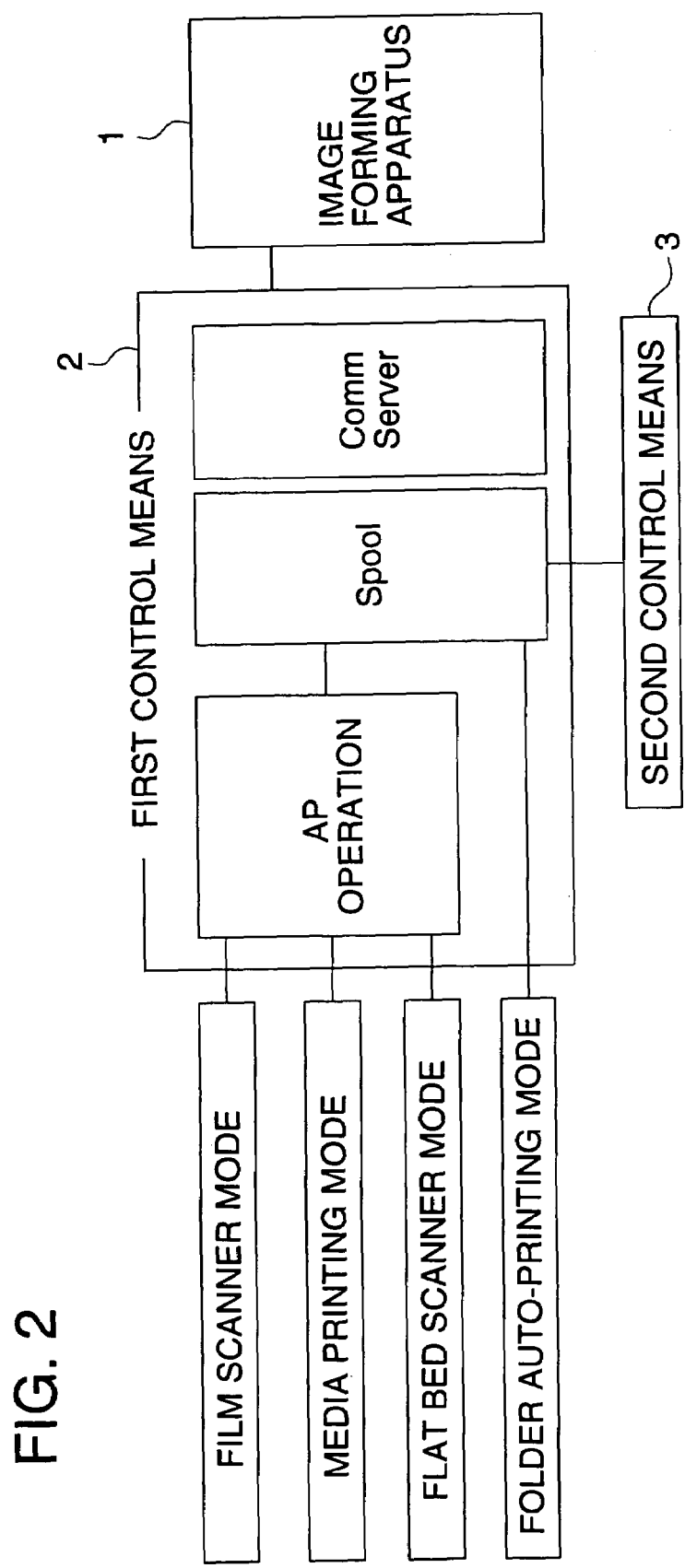
FIG. 2 is a block diagram showing the concrete structure of the first control means.

An embodiment of the invention will be explained in more detail, referring to FIG. 1–FIG. 3. Incidentally, FIG. 1 is a block diagram showing the schematic structure of an image forming system in the present embodiment, FIG. 2 is a block diagram showing the concrete structure of the first control means, and FIG. 3 is a flow diagram showing image forming procedures related to the present embodiment.

As is apparent from FIG. 1, an image forming system of the present embodiment (hereinafter referred to as the present image forming system) is generally provided with image forming apparatus (image forming means) 1, first control means 2, second control means 3, and image information storage means 4.

Among them, the image forming apparatus 1 which forms an image from image information is a digital type one which can record images from image information read out of various recording media including not only a negative film and a reversal film known as a photographic recording material but also a floppy disk and PCMCIA-conforming card, CD-ROM, CD-R, MO, DVD-ROM, DVD-RAM and Zip, and it is controlled by the first control means 2. Incidentally, image information storage means 5 for exclusive use is connected to the first control means 2. To the first control means 2, there are also connected film scanner 6 which digitizes image information contained in the negative film and reversal film and inputs them and flat bed scanner 7 which digitizes image information contained in a reflection type original and inputs them. The first control means 2 may also be connected with a device for reading image information from various recording media such as a driver to read image information from an unillustrated floppy disk.

An operating system (OS) of the first control means 2 can be realized by a personal computer employing Windows, NT 4.0, Workstation (made by Microsoft Corporation). In this case, as shown in FIG. 2, there are provided a film scanner mode for inputting image information from a negative film or a reversal film, a media print mode for controlling various media such as a floppy disk and PCMCIA-conforming card, CD-ROM, CD-R, MO, DVD-RAM, DVD-ROM and Zip, and a flat bed scanner mode for inputting images of a reflection type original. Then, communication is conducted with the second control means 3, for example, with a common folder provided on a Macintosh personal computer connected through LAN (Local Area Network) which employs communication protocol such as TCP/IP or on a personal computer employing an operating system of Windows 95. In this case, the common folder is one which can conduct, from the first control means, writing, reading and changing for a storage device set on the second control means 3 through LAN. As the common folder, it is also possible to introduce an item which specially has server functions such as Free BSD, Linux which is known as PC-UNIX operating on a personal computer and Windows NT 4.0 Server. In this particular case, control of each equipment such as a film scanner mode, a media print mode and a flat bed scanner mode is conducted directly by operation software indicated as AP operation by Windows NT 4.0 Workstation representing the first control means, and driven, and image information is temporarily stored, by the function called Spool, in image information storage means 5 representing a memory which can be controlled directly from the first control means. Then, image information prepared by the second control means under a folder automatic print mode which will be described later is also stored in the image information storage means 5. Image formation order of the image information thus stored in the image information storage means 5 is determined by the function named CommServer in the first control means having the function to judge the priority order for image recording, based on priority order information added to the image information (information showing the priority order for image recording), thus, the image information is sent from the first control means 5 to the image forming apparatus 1, and the image forming apparatus is driven. These Spool and CommServer operate by interlocking with a command relating to image formation conducted by Ap operation in the first control means and image information reading command. Even after the order for image formation has once been determined by CommServer, operation of the Spool to store image information temporarily is continued. Determination of the order for image formation made by the CommServer is also continued until image information stored temporarily in the image information storage means 5 runs short.

In this case, the order for image formation is determined in accordance with priority order information. In the case where the priority order information agrees with the desired date and hour for the finish, when there are two or more image information in each of which the desired date and hour is the same, the decision is made either by the date and hour on which the image information or the priority order information was inputted by the second control means, or by the date and hour on which the image information or the priority order information was inputted in the image information storage means 5.

Incidentally, CommServer conducts image formation in the order for inputting in the image information storage means 5 when no priority order information is given to the image information, or when only one image information is stored in the image information storage means 5.

Now, to the second control means 3, there is connected the image information storage means 4 which is controlled by the second control means 3. Further, in the same way, to the second control means 3, there is connected inputting means for taking in image information (film scanner, flat bed scanner, floppy disk drive and card reader) 8 which is also controlled by the second control means 3 as in the case of the image information storage means 4. Incidentally, though 3 sets in total of the second control means 3 and its accessory device are provided in FIG. 1, the number of sets may also be 1, 2 or 4 or more. Though there is not shown in FIG. 1, in particular, not only the image information storage means 4 but also a customer information storage means are connected to the second control means 3. In this customer information storage means, there are stored an address and name of a customer, image forming size, the number of sheets and texture of a support on which an image is recorded.

Incidentally, the customer information storage means may be provided either separately from or integrally with the image information storage means. When the customer information storage means is provided integrally with the image information storage means, a method wherein customer information and image information are stored separately so that they may correspond to each other and a method wherein customer information is added to image information so that the customer information and the image information are stored as integral information, are available. When customer information and image information are stored separately, both of them can be related to each other by a file name of image information, priority order information such as desired date and hour for the finish (finish of image recording), and a customer name and number. An occasion to store both customer information and image information as integral information by adding the customer information to the image information will be explained as follows. Therefore, the image information is handled as one including customer information. The second control means has therein priority order adding means 9, and it adds priority order information to image information inputted from inputting means 8 based on information showing the priority information such as desired date and hour for the finish inputted from the inputting means 8.

In the present image forming system, the first control means 2 is arranged to transmit image information reading command signals to the second control means 3 through LAN. This transmission of the image information reading command signals to the second control means 3 by the first control means 2 may either be conducted periodically at prescribed intervals such as 5 minutes usually, or be conducted when the image information sent from film scanner 6 or from flat bed scanner 7 and stored in image information storage means 5 runs short. In response to that image information is sent to the first control means through the second control means 3 corresponding to the image information reading command signals, the first control means makes the image information to be stored in the image information storage means 5, and operates image forming apparatus 1 so that image formation may be carried out by the image forming apparatus 1. After completion of image preparation, the first control means notifies the second control means 3 of the completion of image formation through the method which will be explained later (an example being to send the identification information of the image information whose image formation has been completed).

On the other hand, upon receiving the image information reading command signals from the first control means 2, the second control means 3 immediately reads image information stored in image information storage means 4. Then, the image information thus read out is sent to the first control means 2 through LAN, in the arrangement. In the present embodiment, in particular, the second control means 3 is provided with a means to add the priority order information to each image information stored in image information storage means 4, namely with priority order information adding means 9. Actually, therefore, upon receiving image information reading command signals from the first control means 2, the second control means 3 reads the image information to which the priority order information has been added out of the image information storage means 4, and sends it to the first control means 2 through LAN. Image formation from image information is to be conducted based on the priority order information which is added to that image information. In addition to this, the second control means 3 is structured so that it may add information showing completion of image formation to the image information sent from the first control means 2 after completion of image formation.

Incidentally, it is also possible to arrange so that the first control means 2 sends completion information (for example, a file name of image information, or a number specifying the image information) representing the information specifying the image information whose image formation has been completed to the second control means 3, after completion of image formation, and the second control means 3 adds the information showing completion of image recording to the image information stored in image information storage means 4.

Then, an image forming method (hereinafter referred to as the present image forming method) employing the image forming system mentioned above will be explained (see FIG. 3).

When the present image forming method is carried out, image information reading command signals are first sent from the first control means 2 to the second control means 3 through LAN (step A).

Incidentally, in advance to this, the second control means is caused to add the priority order information for conducting image formation to each image information stored in image information storage means 4 (step E). This step, however, corresponds substantially to the operation to input information of date and hour for the finish requested by a customer.

When the second control means 3 has received image information reading command signals sent in the course of the step A stated above, the second control means 3 is caused to read image information stored in image information storage means 4 (step B (F)). Then, the image information thus read in step B is sent from the second control means 3 to the first control means 2 through LAN (step C (G)).

When image information is sent from the second control means 3, the first control means 2 which has received the image information is caused to operate image forming apparatus 1 so that image formation may be carried out for the image information based on the priority order (step D (H)).

After the image formation has been completed for certain image information, the first control means 2 is caused to send the image information whose image formation has been completed to the second control means 3 (step I). Then, the second control means 3 is caused to add information showing completion of image formation to the image information sent from the first control means 2 in step I (step J). As a means to confirm the information showing completion of image formation, in this case, there is given a method to display directly the image information whose image formation has been completed on the monitor of the second control means 3. Or, if an identifier "980811$101112. img" is stored in a common folder of the second control means 3, the aforesaid confirmation can be attained by the first control means 2 which modifies a file name by changing, for example, a "% img" section to "end" in the identifier "980811$101112. img".

Thus, a series of image formations are completed, and after this, the first control means 2 is caused to send image information reading command signals to the second control means 3 at prescribed intervals. This is conducted in succession for all second control means 3 connected through LAN, and if image information exists in attached image information storage means 4, the image information is sent to the first control means 2 through LAN so that image formation is carried out immediately.

As stated above, the first control means 2 sends, first of all, the image information reading command signals to the second control means 3 through LAN representing the communication network. Then, the second control means 3 which has received the image information reading command signals reads image information stored in image information storage means 4, and it further sends the image information thus read to the first control means 2 through LAN. After this, the first control means 2 receives image information sent from the second control means 3, then, operates image forming apparatus 1 and conducts image formation based on the image information. Namely, in the present embodiment, the first control means 2 provided on the part of the image forming apparatus 1 checks the presence or absence of image information to be subjected to image formation by the use of LAN, and if it is present, the first control means 2 spontaneously makes the image information to be subjected to image formation even when an operator does not give a command. It is therefore possible to minimize a period for the image forming means to be suspended, resulting in possibility to promote the efficiency of image forming processing, especially to improve the rate of operation of the image forming means greatly.

In the present embodiment, the second control means 3 is provided with a means to add to each image information stored in image information storage means 4 the priority order information for conducting image formation, namely with priority order information adding means 9. Then, the second control means 3 reads image information to which the priority order information has been added out of image information storage means 4, complying with the request from the first control means 2, and further sends the image information thus read to the first control means 2 through LAN. After this, the first control means 2 receives the image information sent from the second control means 3, then, operates image forming apparatus 1, and causes the image information to be subjected to image formation based on the priority order. Namely, the image information is automatically subjected to image formation based on the priority order designated in advance even when an instruction is not given by an operator. Therefore, there is caused no trouble of delay of the finish, which is different from the occasion in the past where the command for forming images has been issued by an operator.

Though there has been explained an image forming system (image forming method) having therein only one image forming apparatus in the present embodiment, when using plural types of supports for image output each having a different width, for example, it is also possible to provide plural image forming apparatuses corresponding to the number of types of supports for image output. Or, the number of the image forming apparatuses may be increased in accordance with the number to be processed for image forming.

Figure 4:
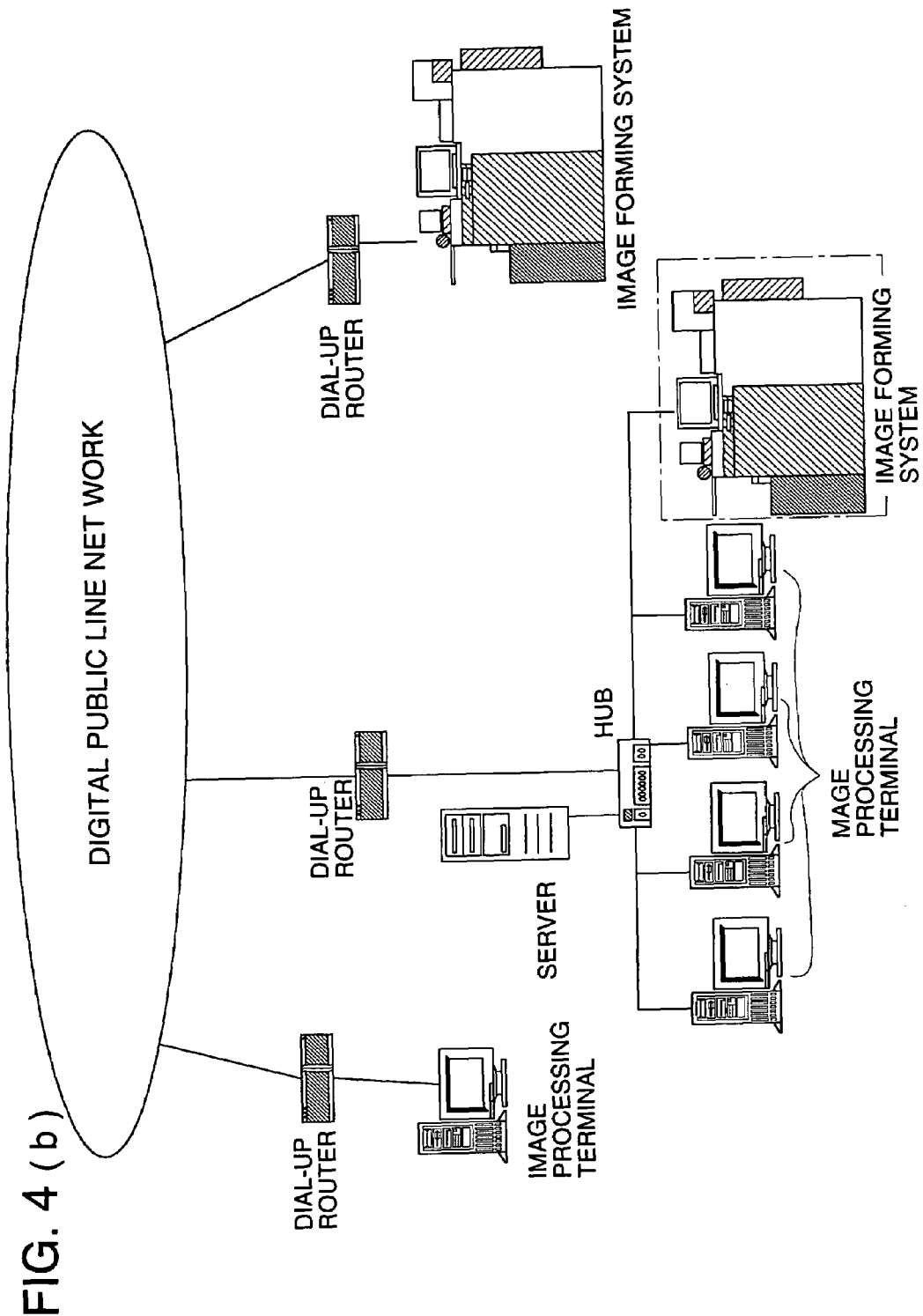

It is further possible to output by selecting automatically the information stored automatically in the second image information storage means in accordance with a width, thickness and texture of an image support which can be outputted and with print types such as post card preparation and business card preparation. As indicated in FIG. 4(*a*), it is further possible to receive image forming information from all areas and to conduct image formation, as indicated in FIG. 4(*a*), by storing images in the image storage means of the second control means which can be detected by the first control means from customer's own home, an image receiving shop having no image forming apparatus, an office of a company, and photographing delivery service using a portable remote terminal through an internet service provider. Further, it is also possible to allocate orders of image output to image forming apparatuses each having desired output conditions through an internet shop controlling plural output channels, and data thus allocated can meet the demand of a customer having various requests, by making the server installed in the shop to serve as an image storage means of the second control means.

Further, in the present image recording system, with regard to media on which images are recorded, recording can be conducted as digital image data on a floppy disk and PCMCIA-conforming card, CD-R, MO, DVD-RAM and Zip, without being limited to a hard copy like image writing on a color photographic paper. To be concrete, image information received from the second control means is temporarily stored in the first storage means, and CommServer gives a command for image recording to an image recording means, which means only changes from an image recording means to a floppy disk drive, and from paper to a floppy disk for image recording, resulting in a difference of formed image between a visible image and a coded image.

Up to this point, LAN of a general type has been used as a communication means in the explanation, but an example wherein another communication means is used will be explained as follows, referring to FIGS. 4(*a*) and 4(*b*). In FIG. 4(*a*), an image forming system shows a developing place in FIG. 1, and it is provided with film scanner 6, flat bed scanner 7, first control means 2, image recording apparatus 1 and with image information storage means 5. An image processing terminal shows an image compilation chamber having inputting means 8, priority order adding information means 9, second control means 3 and image information storage means 4 in FIG. 1, or a reception office. Each means of the image forming system is connected in the same manner as in FIG. 1. Here, the first control means 2 of the image forming system may either send image information reading command signals to the image processing terminal through a hub, or send them to a server. The server, in this case, has only to have at least a second control means and an image storage means, and it sores image information from each image processing terminal connected through a communication means and sends the image information to the first control means in accordance with image information reading command signals from the first control means. In the extended form, sending image information reading command signals to the image processing terminal through a hub, a router and an internet provider service, then through internet and through the router again is exactly the same. Further, it is naturally allowed that the image forming apparatus is directly connected to the router.

Further, as shown in FIG. 4(*b*), the effect is quite the same even when a dial-up router is directly connected with a digital line.

The invention makes it possible to make efficiency of image forming to be high, and to improve, in particular, the rate of operation of an image forming apparatus. It is further possible to form images from image information in the priority order established in advance, resulting in no trouble of delay of the finish. Namely, employment of the technology of the invention makes it possible to comply with diversification in the state of image input and order receiving works.

What is claimed is:

1. An image recording system comprising:
    (a) an image recording device provided in a first location for recording an image based on image information;
    (b) a first controller provided in the first location for controlling the image recording device;
    (c) a memory provided in a second location apart from the first location for storing the image information; and (d) a second controller provided in the second location, which is connected to the first controller through a communication network, for controlling the memory, wherein the first controller sends a reading command signal to the second controller to read the image information stored in the memory, and which causes said second controller to transmit the read information to the first controller through the communication network, and said first controller automatically controls the image recording device so that the image based on the image information transmitted from the second controller is recorded.

2. The image recording system of claim 1, wherein the first controller sends the reading command signal to the second controller at a prescribed interval.

3. The image recording system of claim 1, wherein the first controller sends completion information which indicates the image recording of the image information has been completed to the second controller, after completion of the image recording of the image information, and the second controller generates information indicating that image recording of the image information has been completed based on the completion information.

4. The image recording system of claim 3, wherein the completion information is identification information corresponding to image information.

5. The image recording system of claim 1, wherein the first controller sends completion information which indicates the image recording of the image information has been completed to the second controller, after completion of the image recording of the image information, and the second controller adds second completion information indicating completion of image recording to the image information based on the first completion information.

6. The image recording system of claim 5, wherein the first completion information is identification information corresponding to the image information.

7. An image recording system comprising:
(a) an image recording device provided in a first location for recording an image based on image information;
(b) a first controller provided in the first location for controlling the image recording device;
(c) a memory provided in a second location apart from the first location for storing the image information; and
(d) a second controller provided in the second location, which is connected to the first controller through a communication network, for controlling the memory, wherein the first controller sends a reading command signal to the second controller to read the image information stored in the memory, and to transmit the read information to the first controller through the communication network, and wherein the second controller includes a device for adding priority order information for image recording to each image information stored in the memory, reads the image information to which the priority order information is added, out of the memory, and transmits the image information to the first controller, and wherein the first controller receives the image information transmitted from the second controller, and automatically controls the image recording device so that the image based on the image information is recorded, based on priority order information, and wherein said priority order information is a desired date and hour for finish.

8. The image recording system of claim 7, wherein the first controller sends completion information which indicates the image recording of the image information has been completed to the second controller, after completion of the image recording of the image information, and the second controller generates information indicating that image recording of the image information has been completed based on the completion information.

9. The image recording system of claim 8, wherein the information of the completion is identification information corresponding to the image information.

10. The image recording system of claim 7, wherein the first controller sends first completion information which indicates that image recording of the image information has been completed to the second controller, after completion of the image recording of the image information, and the second controller adds second completion information indicating completion of image recording to the image information based on the first completion information.

11. The image recording system of claim 10, wherein the first completion information is identification information corresponding to the image information.

12. An image recording method comprising the steps of:
sending a reading command signal for reading image information from a first controller provided in a first location to a second controller provided in a second location apart from the first location, which is connected to the first controller through a communication network, the image information being stored in a memory provided in the second location controlled by the second controller;
making the second controller to read the image information out of the memory based on the reading command signal, after the second controller has received the reading command signal;
making the second controller to transmit the image information read out of the memory to the first controller through the communication network based on the reading command signal; and
making the first controller to receive the image information and causing an image recording device to record an image based on the image information, wherein the image recording device is automatically controlled by the first controller.

13. The image recording method of claim 12, wherein the first controller is adapted to send the reading command signal to the second controller at a prescribed interval.

14. The image recording method of claim 12, further comprising the steps of:
sending from the first controller to the second controller the completion information which indicates that image recording of the image information has been completed, after completion of the image recording of the image information; and
making the second controller to generate information showing that image recording of the image information has been completed, based on the completion information.

15. The image recording method of claim 14, wherein the completion information is adapted to be identification information corresponding to the image information.

16. The image recording method of claim 12, further comprising the steps of:
sending from the first controller to the second controller first completion information which indicates that image recording of the image information has been completed, after completion of the image recording of the image information; and making the second controller to add to the image information, second completion information showing that the image recording has been completed, based on the first completion information.

17. The image recording method of claim 16, wherein the completion information is adapted to be identification information corresponding to the image information.

18. An image recording method comprising the steps of:
sending a reading command signal for reading image information from a first controller provided in a first location to a second controller provided in a second location apart from the first location, which is connected to the first controller through a communication network, the image information being stored in a memory provided in the second location controlled by the second controller;
making the second controller add priority order information for image recording to each image information stored in the memory, wherein said priority order information is a desired date and hour for finish;
making the second controller to read the image information to which priority order information has been added out of the memory;
making the second controller to transmit the image information to which the priority order information is added, read out of the memory to the first controller; and
making the first controller which has received the image information to which the priority order information is added, sent from the second controller to automatically cause an image recording device provided in the first location and controlled by the first controller to record an image based on the image information, based on priority order information.

19. The image recording method of claim 18, further comprising the steps of:
sending from the first controller to the second controller the completion information which indicates that image recording of the image information has been completed, after completion of the image recording of the image information; and
making the second controller to generate information showing that image recording of the image information has been completed, based on the completion information.

20. The image recording method of claim 19, wherein the completion information is adapted to be identification information corresponding to the image information.

21. The image recording method of claim 18, further comprising the steps of:
sending from the first controller to the second controller first completion information which indicates that image recording of the image information has been completed, after completion of the image recording of the image information; and
making the second controller to add to the image information, second completion information showing that image recording has been completed, based on the first completion information.

22. The image recording method of claim 21, wherein the completion information is adapted to be identification information corresponding to the image information.

* * * * *